US006816577B2

(12) United States Patent
Logan

(10) Patent No.: US 6,816,577 B2
(45) Date of Patent: Nov. 9, 2004

(54) CELLULAR TELEPHONE WITH AUDIO RECORDING SUBSYSTEM

(76) Inventor: James D. Logan, 81 Castle Hill Rd., Windham, NH (US) 03087

( * ) Notice: Subject to any disclaimer, the term of this patent is extended or adjusted under 35 U.S.C. 154(b) by 0 days.

(21) Appl. No.: 10/160,710

(22) Filed: May 31, 2002

(65) Prior Publication Data

US 2002/0181671 A1 Dec. 5, 2002

Related U.S. Application Data

(60) Provisional application No. 60/295,469, filed on Jun. 1, 2001.

(51) Int. Cl.[7] ............................................... H04M 1/64
(52) U.S. Cl. ........................ 379/67.1; 379/68; 379/76; 379/85; 379/88.13; 379/88.26; 455/412; 455/413
(58) Field of Search ....................... 379/67.1, 69, 70, 379/71, 72, 68, 76, 85, 88.13, 88.26; 455/561, 461, 432, 435, 456, 565, 412, 413, 414

(56) References Cited

U.S. PATENT DOCUMENTS

| 4,481,382 A | * | 11/1984 | Villa-Real | 455/556 |
| 5,333,176 A | * | 7/1994 | Burke et al. | 379/58 |
| 5,544,231 A | * | 8/1996 | Cho | 379/67 |
| 5,559,860 A | * | 9/1996 | Mizikovsky | 379/58 |
| 6,014,429 A | * | 1/2000 | LaPorta et al. | 379/88.15 |
| 6,072,860 A | * | 6/2000 | Kek et al. | 379/88.25 |
| 6,163,596 A | * | 12/2000 | Gelfer et al. | 379/67.1 |
| 2001/0016491 A1 | * | 8/2001 | Imura et al. | 455/432 |

* cited by examiner

Primary Examiner—Allan Hoosain
(74) Attorney, Agent, or Firm—Charles G. Call

(57) ABSTRACT

A cellular telephone handset stores audio files previously recorded by the user and selectively transmitted to the remote listener at a time when it is inappropriate for the handset user to speak, such as when an incoming call arrives when the user in a meeting or theater. In addition, a designated recorded message may be transmitted at future designated time to a designated telephone number supplied by the user, and may request and save a response recorded by the remote listener after the designed message is transmitted. The handset's keypad is used to accept data and commands from the user in a menu system that controls message recording, selection, playback and transmission, as well as the playback of responses recorded by the recipient of a transmitted message. Messages may be entered as character data and transmitted as spoken messages when prerecorded messages do not satisfy needs that arise during a conversation that is being conducted under "silent" conditions.

17 Claims, 2 Drawing Sheets

CELLULAR TELEPHONE WITH AUDIO RECORDING SUBSYSTEM

CROSS-REFERENCE TO RELATED APPLICATIONS

This application claims the benefit of the filing date of the copending U.S. Provisional Patent Application Ser. No. 60/295,469 filed on Jun. 1, 2001.

FIELD OF THE INVENTION

This invention relates to cellular telephones and more particularly to methods and apparatus for transmitting pre-recorded phrases, sounds and messages to a remote listener during a telephone conversation.

BACKGROUND OF THE INVENTION

When engaged in a telephone conversation, cellular phone users are typically confronted with the need to alert the person with whom they are speaking that, because others are nearby, the conversation cannot continue in privacy or without annoying others. In that case, the very act of explaining the problem can itself be awkward or impractical. In consequence, it would be desirable to incorporate into a cellular telephone the ability to transmit a pre-recorded message to the remote party by a pressing a button or actuating some other control on the cellular telephone.

Cellular telephones with built in audio recording and playback capabilities have been developed for performing functions including the recording and playback of dictation and telephone conversations, as well as the playback of pre-recorded announcements used to implement voice mail systems. Where such the voice recording and playback devices are already present in the cellular telephone, the needed additional functionality contemplated by the present invention can be added at little additional cost.

For example, U.S. Pat. No. 6,029,063 issued to Parvulescu et al. describes a voice scratchpad implemented in a wireless telephone that allows the user to record important information gathered during a phone conversation. The wireless telephone includes signal processing means and memory means for recording at least one message or memo, which is spoken over the telephone. The telephone also includes controls for initiating the recording of such a memo and for retrieving and replaying the memo. Indexing may be included which allows the system to record and replay a plurality of memos. The user of the phone can thus record important information in a memo on the voice scratchpad without the need for paper or the concentration and effort required for writing.

Automatic telephone answering systems have also been developed for use with cellular phones which allow the cellular phone operator to place the phone in an automatic answering mode in which the phone answers the incoming call and automatically transmits a message to transmit specific instructions to the caller at the distant telephone. U.S. Pat. No. 5,790,957 issued to A. H. Heidari describes a cellular phone which includes a prompt transmitter which may be used to advise the person at a distant telephone to wait a moment while the cellular phone operator proceeds to another location wherein it is appropriate to lift the receiver and begin speaking. The prompt feature avoids the situation wherein a telephone caller may hang up prematurely before the intended called person has a chance to pick up the receiver and begin conversing.

The foregoing systems do not, however, allow the cellular phone operator to employ the cellular phone's pushbutton controls to select and transmit a selected pre-recorded message to a caller during a conversation. In addition, it would be desirable to allow the cellular phone operator to transmit a repertoire of short response messages (e.g. "Yes," "No," "Maybe," and "I don't know.") that allow the remote party to ask questions to and then obtain responses from the cellular phone operator without requiring the cellular phone operator to speak.

A related problem occurs when a cellular phone user is unable to complete a call to send important information to a remote party before the cellular phone user needs to attend a meeting or otherwise be unable to conveniently complete the call. In that instance, it would be desirable to record a message to be transmitted later, along with a telephone number to be called, so that the cellular phone can later automatically place a call to that number and transmit the recorded message to the answering party, without requiring attention from the cellular phone operator.

In some cases, the need to transmit a spoken message from a cellular phone in private cannot be foreseen. It would accordingly also be desirable to provide means for storing a keyboarded message (which may consist of only one or just a few words) as text, and then employing speech synthesis to convert the keyboarded message into a spoken audio transmission that is sent to the remote party.

BRIEF SUMMARY OF THE INVENTION

It is accordingly an object of the invention to selectively transmit pre-recorded messages from a cellular phone to a remote telephone.

It is a further object of the invention to permit a cellular phone operator to pre-record and transmit spoken messages at a later time.

It is a still further object of the invention to enable a cellular phone operator to employ the pushbuttons or keys on a cellular phone to select the time, destination, and content of recorded messages transmitted to a remote caller.

As contemplated by the invention, the cellular telephone preferably includes a digital memory for storing digitized voice signals and means for capturing spoken messages using the cellular phone microphone and storing those messages as a digital recording in the digital memory. The pushbuttons or keys provided on the cellular telephone are then manipulated by the operator to selected one of the pre-recorded messages for transmission to the remote caller.

The cellular telephone keypad may be used to accept keyboarded message identification labels that may later be displayed as menu items on the cellular telephone's display to facilitate the identification and selection of previously recorded messages. In addition, the keypad and display may be used to compose text message that may later be converted into spoken audio form for transmission to a remote telephone.

The stored messages may be recorded in the voice of the caller, or may be selected from a stored library of pre-recorded audio messages, sound files, MIDI music files, or may comprise text data which can be converted to speech. These stored messages may either be entered by the caller, provided as standard stored text, which is converted to spoken form using speech synthesis.

The pre-recording audio or text messages stored in the digital memory may be selectively transmitted either during an ongoing telephone conversation at the request of the cellular phone operator, or by entering a telephone number to be called and associating that number with one or more messages and then, after a predetermined time interval or at a predetermined scheduled time, initiating the transmission of the identified message(s) when a telephone connection is successfully established between the cellular phone and the associated phone number.

DETAILED DESCRIPTION

Figure 1:
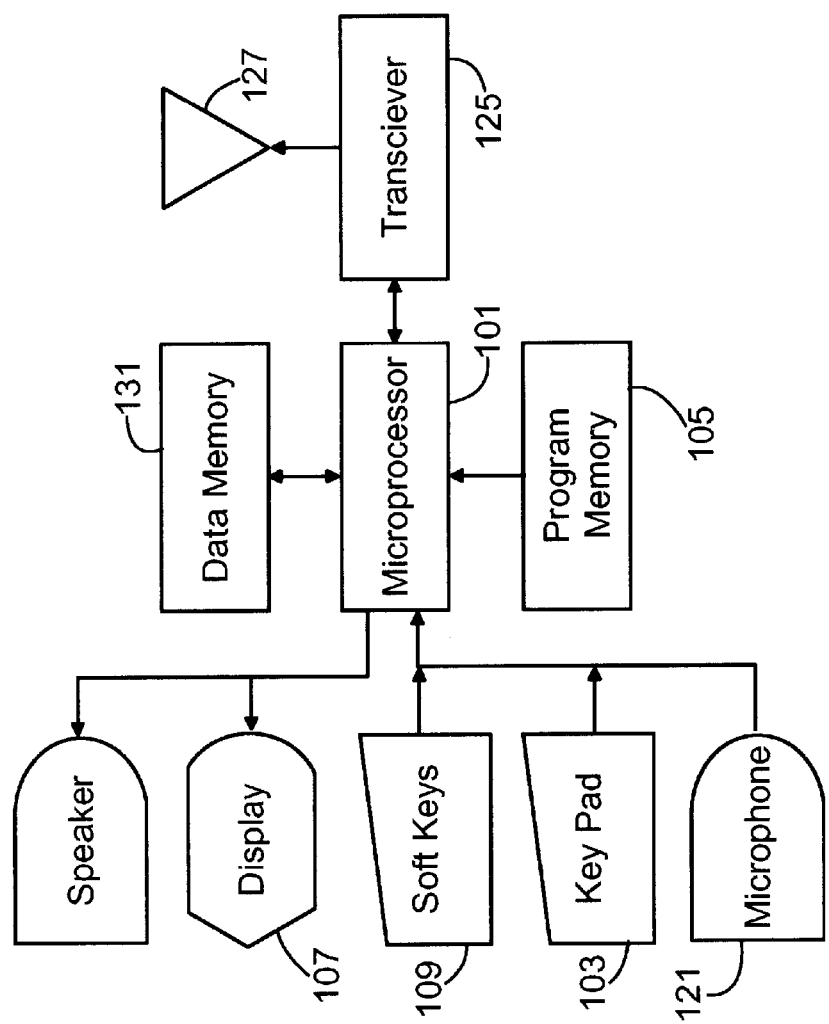
FIG. 1 is a block diagram illustrating the principal components of the cellular telephone that are used to implement the present invention.

As described below, the invention may be used to particular advantage in connection with a cellular telephone and may be implemented using conventional components of the type commonly used in advanced cellular phone systems. The makeup and organization of these components is illustrated in FIG. 1 of the drawings and consists of a microprocessor 101 that executes routines initiated by the operator's manipulation of a keypad 103. Pressing a given key on the keypad 103 initiates a routine defined by a stored program in the program memory 105. The cellular phone further includes a display 107 that typically takes the form of a small, backlit LCD panel. The panel may be used to display a menu of items that may be selected by the user using "soft keys" seen at 109 that are visually associated with the displayed menu items. U.S. Pat. No. 5,737,394 entitled "Portable telephone apparatus having a plurality of selectable functions activated by the use of dedicated and/or soft keys" describes the manner in which both the dedicated keys of a keypad and soft keys may be used in combination to implement a menu driven control arrangement for a cellular telephone. Alternatively, as will be described in more detail in connection with FIGS. 2–3 of the drawings, the functions performed may be displayed as a list of options and cursor keys may be used to invoke selected functions and submenu's identified on the display 107.

The cellular telephone further includes a microphone 121 for capturing spoken voice signals from the operator, a speaker or earpiece 123 for delivering audible sounds to the operator, and a cellular transceiver 125 for sending and receiving radio frequency transmissions to and from the cellular telephone system via the antenna 127.

The microprocessor 105 includes analog-to-digital conversion means for converting analog voice signals from the microphone 121 into digital form for storage in a data memory 131. In addition, using a text-editing program stored in program memory 105, the keypad 103 may be used to compose text messages, which are stored as character data in the data memory 131.

Figure 2:
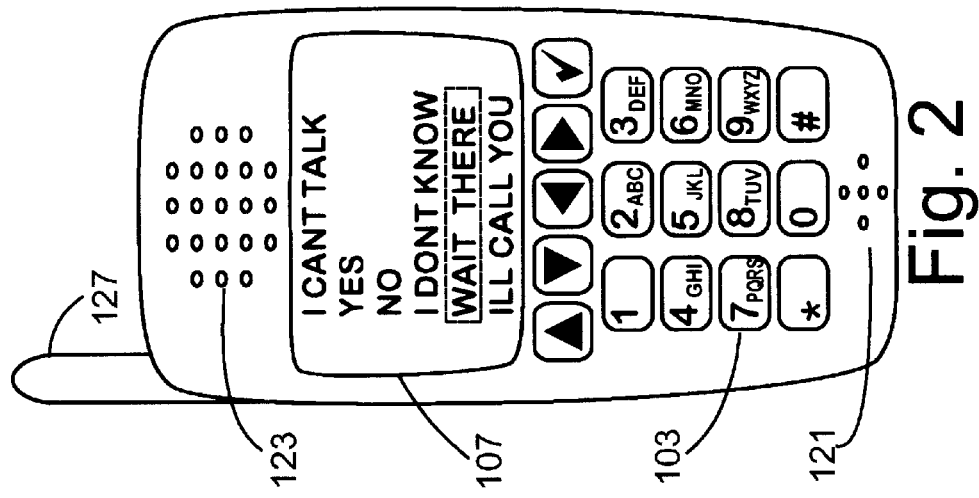
FIG. 2 illustrates the exterior of a cellular telephone handset that includes a keypad and display which enables the user to control the recording, identification, selection and transmission of recorded messages.

FIG. 2 shows the exterior of an illustrative cellular telephone handset which houses the components shown in the block diagram of FIG. 1. The handset uses a conventional numeric keypad 103 for dialing and softkeys whose function depends on the content shown on the display 107. The softkeys include an UP cursor key 211, a DOWN cursor key 212, a LEFT cursor key 213, a RIGHT cursor key 214, and an OK key 215.

When a menu screen is displayed, the cursor keys 211–214 are used to highlight a selected one of several displayed labels, and the OK key 212 is used to invoke the operation designated by the selected label. For example, as seen in FIG. 2, the display screen 107 may display a scrollable listing of labels each of which specifies a particular one of a collection of prerecorded messages. By pressing the UP and DOWN cursor keys 211 and 212, the user may highlight a selected label on the scrollable list, and may select the highlighted message by pressing the OK key 215.

The cursor keys enable the user to select and transmit prerecorded messages to a calling party when it is inappropriate for the cellular phone user to speak, such as when the phone "rings" in a silent "vibrate" mode when the user is in a meeting or a theater. In these situations, the user may select and transmit a desired message to send to the calling party using the cursor keys without disturbing others. In some situations, however, such as recording spoken messages or entering text messages, voice commands may be used to advantage. The program memory 105 may include voice recognition routines for converting spoken commands into interface commands for selecting and initiating functions. In order to differentiate conventional speech from voice commands, a selected soft key or dedicated key, or a unique spoken command, may be used to place the device in voice command mode. In voice command mode, the user may select and invoke a particular function by speaking the word or words corresponding to one of the displayed labels. To enter a text message, the user may speak the names of letters, numerals and punctuation marks. In each case, because the total vocabulary of acceptable spoken commands is limited, a speech recognition program of limited capability of the kind now commonly incorporated in cellular telephones to implement voice commands may be used.

Figure 3:
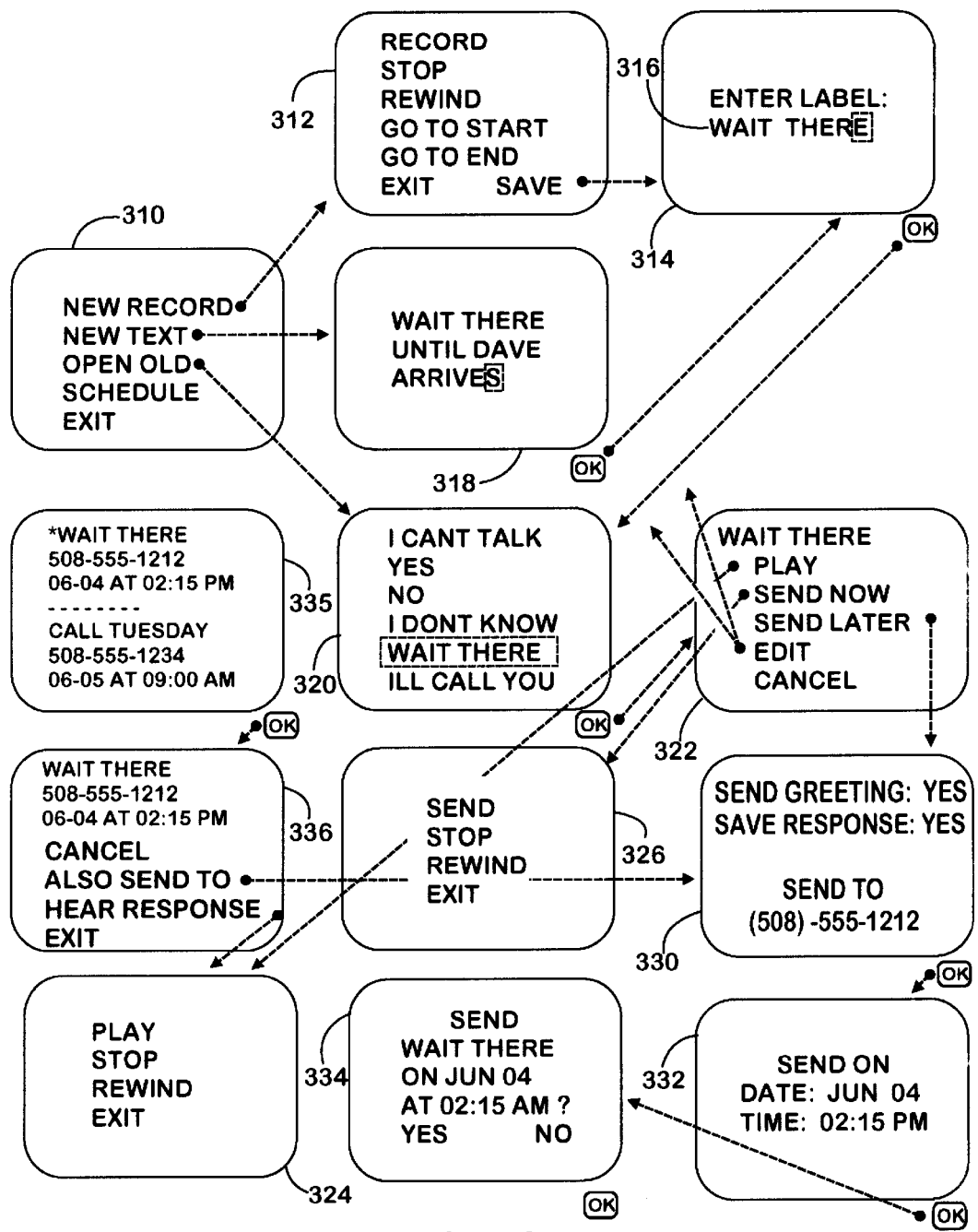
FIG. 3 illustrates the interrelationship of a collection of displayed selection menus which may be used by the operator to perform functions contemplated by the invention.

As contemplated by the present invention, the programs stored in the program memory 105 enable the operator to initiate and perform a number of interrelated functions, any one of which can be performed by beginning with "message menu" seen at 310 in FIG. 3.

By using the UP and DOWN cursor keys 211 and 212, the user may highlight the label NEW RECORD on the message menu 310. When the OK key 215 is pressed, the recording control menu 312 is displayed. When the label RECORD is selected on menu 312, the microprocessor 101 digitizes and stores the sounds received by the microphone 121 in the handset's data memory 131. While recording is in process, the user can highlight and select labeled functions on the recording control menu 312 to STOP the recording, REWIND the current recording by an incremental amount and begin replaying the recording at an earlier point, or may select GO TO START or GO TO END to move to the start or end of the current recording. Again selecting RECORD on the menu 312 causes the system to begin recording again at the currently selected playback point, overwriting the prior recording from the playback point forward. The user can abandon the recording session by highlighting and selecting the EXIT label or may select the SAVE label on the menu 312 to display the label entry dialog screen 314 seen in FIG. 3.

Using the record control menu 312, the user may a spoken message (or other sound, such as a musical selection) captured by the microphone 121 and stored as digital data in the data memory 131. This data may be stored in compressed form to minimize the amount of memory space required. The messages created by the operator and recorded in this fashion for future use may supplement a library of standard messages that are "built into" the cellular phone and recorded, for example, in the read-only non-volatile program memory 105.

The label entry dialog screen 314 enables the user to enter a short descriptive label which describes the recording created while the recording control menu 312 was being displayed. The label may be created by using the LEFT and RIGHT cursor keys to highlight a particular character position in a sixteen (16) character entry field seen at 316. With the desired character position selected, the user may then use the UP and DOWN cursor keys to scroll through a list of characters, numerals and punctuation marks. When the desired character is displayed, a LEFT or RIGHT cursor key is pressed to advance the highlighted position to the next or any different position in the 16 character field. When the desired label has been entered, the OK key is pressed to store the created recording as a named audio file in the data memory 131 and to display a new list of the available message files in the available recording menu seen at 320. The descriptive label text entered using the label entry dialog screen 314 describes the content of the recorded audio message or sound. The descriptive label may also be used as the spoken name label that allows each message to be identified by voice command. Pressing the OK key when no characters have been entered returns the display to screen 312 (or to screen 318 if entered from the text editor screen 318 to be described next).

By selecting the label NEW TEXT on the message menu 310, the user may invoke the operation of text editor program stored in the program memory 105 that displays the text editor screen 318 which permits the operator to enter and edit a text message. Individual character positions in the text are entered in the same way that characters are entered on the field 316 of the label entry dialog screen 314: that is by using the LEFT and RIGHT cursor keys to highlight a particular character position in the text (which, in the text editor screen 318, may occupy multiple lines) and by using the UP and DOWN cursor keys to select a particular character from a scrollable set of characters to be displayed at the selected position.

To facilitate entry into the character field 316 or the text editor screen 318, the user may press one of the keys on the dialing keypad seen at 103 in FIGS. 2 and 3 which has the effect of limiting the scrollable list of available characters from which a particular character is desired using the UP and DOWN cursor keys. For example, pressing the "5-JKL" key on the keypad restricts the list of characters selectable using the UP and DOWN keys to "5", "J", "K", and "L", thus speeding character selection.

Pressing the OK key from the text editor screen displays the label entry dialog screen 314 to permit the user to enter a descriptive label for the text message. As in the case of spoken messages, text messages created and saved by the user may supplement built-in pre-recorded text messages stored in read-only non-volatile memory.

When the available recording menu 320 is displayed, the user may press the UP and DOWN cursor keys to scroll through the list of available messages to highlight a particular desired message, and then press the OK key 215 to display the message action menu 322 seen in FIG. 3. The message identification label selected using menu 320 is displayed at the top of the message action menu 322. The user then selects a particular function to be performed with respect to the selected message. When the selected message is a recorded audio file, the file may be played back or transmitted as previously recorded. When the selected message is a text message it is converted to a spoken message using speech synthesis during transmission or playback. If the selected message is a text message and if the remote station is transmitting a facsimile tone signal, the message may be converted to a facsimile message such that it is reproduced in text form at the remote location.

By selecting the label PLAY on message action menu 322, the user starts the playback (audible on to the handset user) of the selected message while displaying the playback control menu 324. The options on the playback control menu allow the user to STOP the playback until PLAY is pressed again, REWIND the message recording to the beginning and restart the playback, or EXIT to abort the playback. If the message is allowed to playback to its conclusion, the playback control menu display is continued for a brief, predetermined period to provide the user with an opportunity to select REWIND to repeat the playback, and then terminates, returning the handset to normal operation.

By selecting SEND NOW on the message action menu 322, the selected message begins to play at the beginning and is audible both the user and the remote party. During message transmission, the send control menu 326 is displayed and operates like the playback control menu 324 (except that SEND rather than PLAY is displayed). By selecting STOP, the user can terminate (or pause) the transmission, which can be resumed by selecting SEND. By selecting REWIND, the user can repeat the transmission. If the complete message is transmitted to its conclusion, the playback control menu display is continued thereafter for a brief, predetermined period to provide the user with an opportunity to select REWIND to repeat the transmission, and then terminates, returning the handset to normal operation. When the message is being transmitted to the remote listener, the mute buttons on the cellular telephone (not shown), or an additional MUTE menu command on the screen 326, can be activated so that the user can speak when others are in the room without the user's speech being transmitted. Otherwise, transmitted messages are overlayed as background sounds on anything the user might say over the cellular telephone connection. In addition, a further "speaker off" control can be added to suppress all sound from the speaker 123 to prevent annoying sounds from being emitted when the user is in a theater or a similar situation and is being used to transmit prerecorded audio recordings. In addition, the user may simply "hang up" while a recording is being transmitted, and the recorded transmission will then continue until its conclusion, when the cell phone will automatically hang up.

By selecting SEND LATER on the message action menu 322, a first transmittal dialog screen 330 is displayed, requesting the user to specify whether or not a greeting is to be sent before the selected message, and whether or not the remote listener is to be given the opportunity to record a response to the message which is then saved in the handset's data memory for later playback. The user uses the LEFT and RIGHT cursor keys to highlight the option fields to the right of the SEND GREETING and SAVE RESPONSE, and uses either the UP or DOWN cursor keys to toggle the field between the YES, NO and NEW options. Whenever the NEW option is set for either option field, the unit displays the record control screen 312 to accept the recording of a new greeting or response prompt in the voice of the handset user. For example, a typical recorded greeting might contain the spoken words "THIS IS JOHN DOE. SORRY I CAN'T SPEAK TO YOU IN PERSON NOW, BUT PLEASE LISTEN TO THE FOLLOWING PRERECORDED MESSAGE." An illustrative response prompt might contain the following spoken words "YOU MAY RECORD A RESPONSE TO THIS MESSAGE BY SPEAKING AT THE SOUND OF THE TONE. PRESS THE STAR KEY TO END YOUR RESPONSE. THANKS."

After the greeting and response options are selected, the user enters the telephone number to which the message is to be sent using send-to dialog screen 330. The desired telephone number is simply keyed on the keypad 103 after the LEFT and RIGHT cursor keys are used to highlight the telephone number field.

When the desired telephone number has been entered, the OK button is pressed to display a time-to-send entry screen 332. The entries for the date field may be entered using the UP and DOWN cursor keys to select the month (which, by default, is the current month), then using the UP and DOWN keys to select a day of the month (which by default is the current day of the month). The year need not be displayed and is presumed to be the current year for the current month and day, or any subsequent date in the calendar year, and is presumed to be the next following year for any earlier date. When either the time or date is correct, that field can be exited and another edited by using the LEFT and RIGHT cursor keys. Pressing the OK indicates the displayed date and time are acceptable, and causes the confirmation screen 334 to be displayed. The confirmation screen summarizes the entries made on screens 330 and 332 and requests the user to confirm that the selected message should be sent to the designated number at the specified time and date. If the user selects "YES" and presses the OK button, the message transmission is scheduled. Otherwise, the attempt to designate a message for future transmission is aborted.

By selecting the SCHEDULE label on the message menu 310, the user can display a listing of messages scheduled for transmission as seen at 335. The schedule list menu 335 presents a scrollable listing of messages scheduled for transmission, with each on being listed by its identifying label, the telephone number to which it is to be sent, and the date and time when it is scheduled for transmission. Messages which have already been successfully transmitted may be flagged on the listing with a first icon, and messages to which the remote listener has recorded a response may be identified with a different icon (such as the asterisk to the left of the WAIT HERE message identifying label shown on screen 335.

Using the UP and DOWN cursor keys to select a particular message and pressing the OK button on screen 335 causes the scheduled message menu 336 to be displayed. Using menu 336, the user can elect to CANCEL the scheduled transmission or can elect ALSO SEND TO which displays the telephone number entry screen 330, the date and time entry screen 330, and the confirmation screen 334 in sequence, making it easy to send a copy of the same message to different parties at different times. Selecting EXIT at the menu 336 leaves the schedule unchanged. At the time specified, the designated number is called and, if a connection is established, the recorded message is transmitted to the called party.

To help insure that this automated call is properly received, a pre-recorded, standard greeting message may transmitted before the message recording or text to identify the caller and explain that a prerecorded message is about to be transmitted as discussed above with reference to screen 330. The prompt message may indicate whom the call is for and/or ask the receiving party to indicate that he or she is ready to accept the message by pressing a designated key. The cellular phone then responds by sending the recorded message only when the proper DTMF dialtone signal is keyed at the remote telephone and received at the cellular phone in response to the prompt message. If the called number is equipped with a telephone answering system which answers the call instead of a human, the cellular phone may employ its voice recognition capability to transmit the same or a different message only after the answering mechanism at the other end is ready to record. The presence of voice recognition capability also makes it possible to match the voice of the person answering the telephone with the stored voice characteristics of the desired party and to transmit the previously recorded message only if the desired party answers the phone. The cellular telephone may be programmed to attempt to call the same number later when the called telephone does not answer or properly indicated that it is ready to receive the transmission.

The "message files" need not be limited to spoken messages. Music and other sounds may be recorded and uploaded for replay and transmission using the cellular phone. The cellular phone could further include stored routines for performing music synthesis; that is, converting uploaded and stored MIDI music files into audible form. The text-to-speech capabilities of the processor, used to transmit keyboarded messages in spoken form as described above, may be used to replay and transmit text files such as uploaded email messages. In this way, the user may retrieve incoming email from an ISP and replay or retransmit the content as spoken text.

The handset may also be programmed to send a standard spoken prompting message to the called party after the message transmission is concluded indicating that a spoken response may be provided. For example, the prompt might say: "IF YOU WISH TO RESPOND TO THIS MESSAGE, PLEASE SPEAK AT THE SOUND OF THE TONE. PRESS THE STAR KEY WHEN YOU HAVE FINISHED." If the called party records a response, it may be accessed by first selecting the transmitted message using the schedule menu 335 and then selecting the HEAR RESPONSE label (displayed only when a response has been recorded).

The handset described above may be employed to transmit one or more recorded messages to several different phone numbers. Thus, a message may be recorded and then transmitted in separate telephone calls to each telephone number. Thus, for example, if it became necessary to reschedule a meeting to a different time, a single advisory message could be dictated and transmitted to all of the meeting attendees, and the transmitted message could include a request that the recipient dictate a reply indicating whether or not the recipient expected to attend.

Sound files obtained from a variety of sources may be stored and shared among a community of friends or associates by using the telephone communications device to store sound files and share them with others. Excerpts from songs, movie sound tracks, and other works, which are made available by the copyright owners for promotional purposes, could be freely shared. Along with jokes, animal sounds, MIDI music files, or other entertaining sound clips, these short recordings could be collected and shared with others.

Conclusion

It is to be understood that the specific methods and apparatus that have been described are merely illustrative of applications of the principles of the invention. Numerous modifications may be made to the described embodiment without departing from the true spirit and scope of the invention.

What is claimed is:

1. A cellular telephone handset comprising, in combination, a memory for persistently storing a plurality of audio files each of which is designated by unique identifying label data, a microphone for converting audible sounds into an audio signal, a keypad for accepting the entry of data and commands from a user of said handset) means for storing said audio signal in said memory as one of said audio files designated by identifying label data entered by said user using said keypad, and means responsive to one or more commands entered by said user using said keypad for designating a selected one of said audio files and for transmitting said selected one of said audio files via the cellular telephone system to a remote listener during an ongoing telephone conversation between said user and said remote listener.

2. A cellular telephone handset as set forth in claim 1 further comprising a display and wherein said means for designating a selected one of said files comprises means responsive to a command entered by said user using said keypad for displaying the identifying label data designating each of said plurality of files and means responsive to a selection command entered by said user using said keypad for selecting the identifying label data designating said selected one of said files.

3. A cellular telephone handset as set forth in claim 1 further comprising means responsive to specification data entered by said user using said keypad for transmitting a selected one of said audio files to a particular telephone number at a predetermined future time, said particular telephone number and said predetermined time being specified by said specification data.

4. A cellular telephone handset as set forth in claim 3 further including means for recording a response from said remote listener after said selected one of said audio messages is transmitted to said remote listener.

5. A cellular telephone handset as set forth in claim 4 further including means responsive to one or more commands entered by said user using keypad for selecting and playing a particular one of a plurality of previously recorded responses from remote listeners.

6. A cellular telephone handset as set forth in claim 1 further comprising means responsive to specification data entered by said user using said keypad for identifying said selected one of said audio files and means responsive to a command entered by said user using said for thereafter initiating the transmission of said selected one of said audio files to a remote listener during an ongoing telephone conversation between said user and said remote listener.

7. A cellular telephone handset as set forth in claim 6 further including means responsive to a command entered by said user using said keypad for terminating the transmission of said selected one of said audio files.

8. A cellular telephone handset as set forth in claim 7 further including means responsive to a command entered by said user using said keypad for repeating the transmission of said selected one of said audio files.

9. In combination with a cellular telephone handset which includes an digital data memory, a data processor, a keypad for accepting commands and data from a user, a display for producing visible images generated by said processor, a microphone for accepting audio signals for transmission to remote listener, and a speaker for conveying audio signals into audible form for said user, the improvement comprising:

recording means responsive to a record command from said user for converting audio signals from said microphone into a file of digital audio data and for storing said file in said digital memory, selection means responsive to one of more commands from said user for selecting said file of digital audio data from a plurality of stored digital audio data files, and transmission means for transmitting said file of digital audio data to a remote listener via the cellular telephone system in response to a transmission command from said user during an ongoing telephone conversation between said user and said remote listener.

10. The improvement set forth in claim 9 further comprising means for accepting identification label data from said user which uniquely identifies each of said plurality of audio files stored in said memory and wherein said selection means comprises means for producing a visible list of said files as described b said label data and means for accepting a selection of one of said files on said list from said user.

11. The improvement set forth in claim 9 further comprising means responsive to specification data entered by said user using said keypad for transmitting a designated one of said audio files to a designated telephone number at a designated future time.

12. The improvement set forth in claim 11 further including means for recording a response from said remote listener after said designated one of said audio files is transmitted to said remote listener.

13. The improvement set forth in claim 12 further including means responsive to one or more commands entered by said user using keypad for conveying said response as recorded into audible form.

14. The improvement set forth in claim 9 wherein said transmission command initiates the transmission of said file of digital audio data to said remote listener.

15. The improvement set forth in claim 14 further including means responsive to a command entered by said user using said keypad for terminating the transmission of said selected one of said audio files.

16. The improvement set forth in claim 15 further including means responsive to a command entered by said user using said keypad for repeating the transmission of said selected one of said audio files.

17. The improvement set forth in claim 9 further including means for accepting a text message expressed as character data entered by said user using said keypad and for converting said text message into an audible message signal transmitted to a remote user in response to a command from said user.

* * * * *